United States Patent
Chastain et al.

(10) Patent No.: US 6,842,775 B1
(45) Date of Patent: *Jan. 11, 2005

(54) METHOD AND SYSTEM FOR MODIFYING MAIL RULES

(75) Inventors: Alicia Anne Chastain, Raleigh, NC (US); Christopher Joseph Paul, Durham, NC (US); David Mark Wendt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 426 days.

This patent is subject to a terminal disclaimer.

(21) Appl. No.: 09/650,849

(22) Filed: Aug. 29, 2000

(51) Int. Cl.[7] ............................................. G06F 15/16
(52) U.S. Cl. ..................................... 709/207; 707/102
(58) Field of Search ................................ 709/206, 207; 707/102, 103 R

(56) References Cited

U.S. PATENT DOCUMENTS

| | | | | |
|---|---|---|---|---|
| 5,283,856 A | * | 2/1994 | Gross et al. ................ 395/51 |
| 5,377,354 A | | 12/1994 | Scannell et al. ............ 395/650 |
| 5,758,354 A | | 5/1998 | Huang et al. ............... 707/201 |
| 5,794,001 A | | 8/1998 | Malone et al. .............. 395/342 |
| 5,862,325 A | | 1/1999 | Reed et al. ............ 395/200.31 |
| 5,899,995 A | * | 5/1999 | Millier et al. ............... 707/102 |
| 5,917,489 A | | 6/1999 | Thurlow et al. ............ 345/347 |
| 5,948,058 A | | 9/1999 | Kudoh et al. ............... 709/206 |
| 5,978,566 A | * | 11/1999 | Plank et al. ........... 395/200.36 |
| 6,021,427 A | | 2/2000 | Spagna et al. .............. 709/206 |
| 6,023,700 A | | 2/2000 | Owens et al. ................ 707/10 |
| 6,044,205 A | | 3/2000 | Reed et al. ............ 395/200.31 |
| 6,216,122 B1 | * | 4/2001 | Elson ............................. 707/3 |
| 6,411,947 B1 | * | 6/2002 | Rice et al. .................... 706/47 |
| 6,424,995 B1 | * | 7/2002 | Shuman ...................... 709/206 |
| 6,598,034 B1 | * | 7/2003 | Kloth ........................... 706/47 |
| 6,654,787 B1 | * | 11/2003 | Aronson et al. ............ 709/206 |

OTHER PUBLICATIONS

*Configuring E–mail to be Forwarded into Folders*, http://www.tpk.net/tpk/configuring_forwarding.html,, Apr. 25, 2000, pp. 1–2.

*Smartmail Knowledge–Based System for the Officevision Desktop*, IBM Technical Disclosure Bulletin, Nov. 1990, p. 414.

*Rule–Based Dynamic Personal Variables*, IBM Technical Disclosure Bulletin, Nov. 1994, pp. 539–540.

* cited by examiner

Primary Examiner—Zarni Maung
Assistant Examiner—Kimberly D Flynn
(74) Attorney, Agent, or Firm—A. Bruce Clay; Synnestvedt & Lechner LLP

(57) ABSTRACT

A method in a data processing system for modifying rules to process electronic messages. User input is detected moving an electronic message into a folder, wherein a rule is associated with the folder, or performing a specific action on a electronic message such as forwarding it. In response, determining whether the electronic message matches the rule associated with the folder or action. Characteristics of the electronic message are identified if a match between the rule and the electronic message is absent. The rule for the folder or action is modified using the characteristics to form a modified rule.

27 Claims, 10 Drawing Sheets

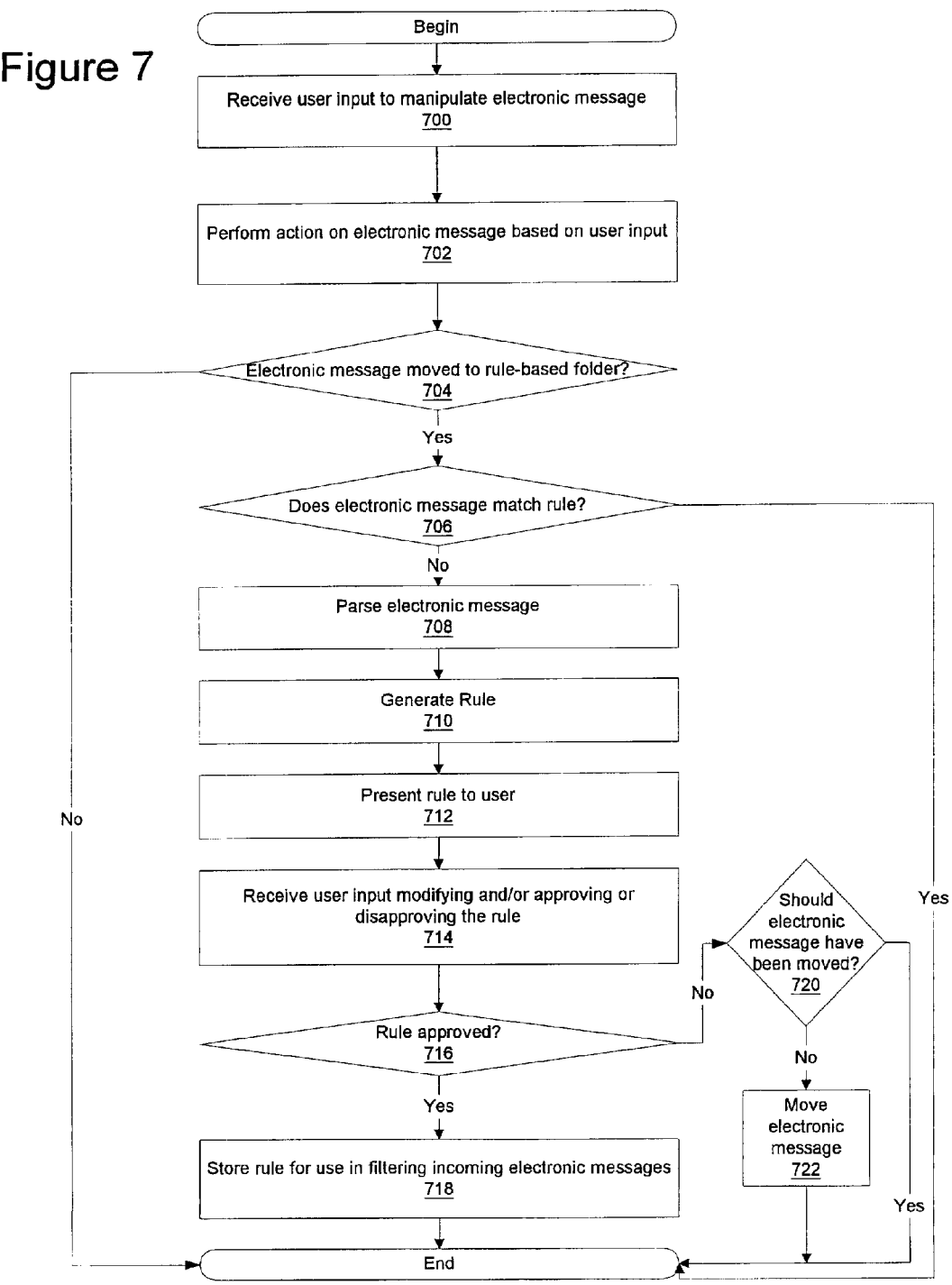

METHOD AND SYSTEM FOR MODIFYING MAIL RULES

CROSS REFERENCE TO RELATED APPLICATION

The present invention is related to an application entitled METHOD AND SYSTEM FOR CREATING MAIL RULES FROM EXISTING MAIL, Ser. No. 09/649,946, all of which are filed even date hereof, assigned to the same assignee, and incorporated herein by reference.

FIELD OF THE INVENTION

The present invention relates generally to an improved data processing system and in particular to a method and apparatus for processing electronic messages. Still more particularly, the present invention provides a method and apparatus for modifying rules for processing electronic messages.

BACKGROUND OF THE INVENTION

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of information, entertainment, and communications. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

In addition to being a source of information, the Internet also provides a communications medium. The Internet has become the most popular computer network used by consumers and businesses to send and receive electronic messages or mail, also referred to as Ae-mail@. The Internet allows users to readily send and receive e-mail to and from computers around the world. Each user typically has a unique Internet e-mail address (e.g., steve@ibm.com). A user with an e-mail account and a computer capable of connecting to the Internet can easily send and receive e-mail over the network.

E-mail allows a person to quickly and easily send textual messages and other information, such as, for example, pictures, sound recordings, and formatted documents electronically to other e-mail users anywhere in the world. An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on the recipient=s computer, can then "receive" the message.

When receiving messages, the messages are typically placed in an Ainbox@ from which the recipient can view the messages. Additionally, some e-mail programs allow a user to set up rules for intercepting messages intended for them and acting upon the message via a Amail@ rule. For example, a user may set up a rule to direct any mail received from a particular sender to be automatically placed into a selected folder. Many e-mail programs allow the users to define rules to perform actions on incoming messages. For example, the rule may perform a selected action based on the content of a mail header or the specific content of the message. In another example, the user may direct any mail received containing a selected phrase in the body of a message to be automatically deleted. Currently available e-mail programs provide a user interface for the user to compose and modify rules for use in filtering and processing messages. These interfaces are sometimes confusing and complicated for users. Currently, the rules are typically created manually through a series of dialogs in which a user defines the rule, what conditions must be present for the rule to take effect, and the resulting action. If the user desires to modifying a rule, the user must use the dialogs to define the change in the rule. As a result, some users do not use rules to filter and process messages.

Therefore, it would be advantageous to have an improved method and apparatus for modifying rules used in processing incoming messages.

SUMMARY OF THE INVENTION

The present invention provides a method in a data processing system for modifying rules to process electronic messages. User input moving an electronic message into a folder is detected, wherein a rule is currently associated with the folder. The user input also may be, for example, forwarding the electronic message. In response, determining whether the electronic message matches the rule associated with the folder or action. Characteristics of the electronic message are identified if a match between the rule and the electronic message is absent. The rule for the folder or action is modified using the characteristics to form a modified rule.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart of a process used for modifying a rule based on user manipulation of an electronic message in accordance with a preferred embodiment of the present invention.

DETAILED DESCRIPTION OF THE PREFERRED EMBODIMENT

Figure 1:
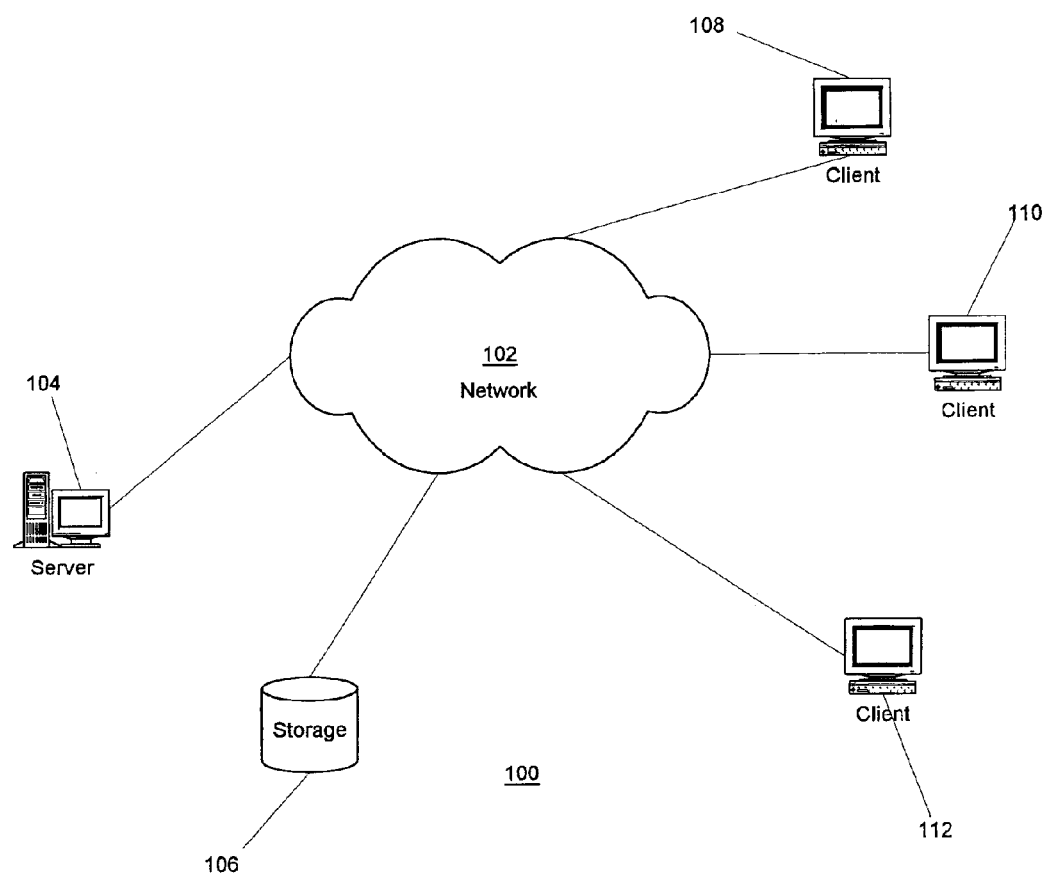
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In the depicted examples, server 104 may contain an electronic mail system from which clients 108, 110, and 112 send and receive e-mail messages through e-mail programs or applications located on the clients. E-mail messages also are referred to as electronic messages. Distributed data processing system 100 may include additional servers, clients, and other devices not shown. For example, messages may be sent and received between server 104 and other servers (not shown) to distribute and receive messages from other clients (not shown).

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
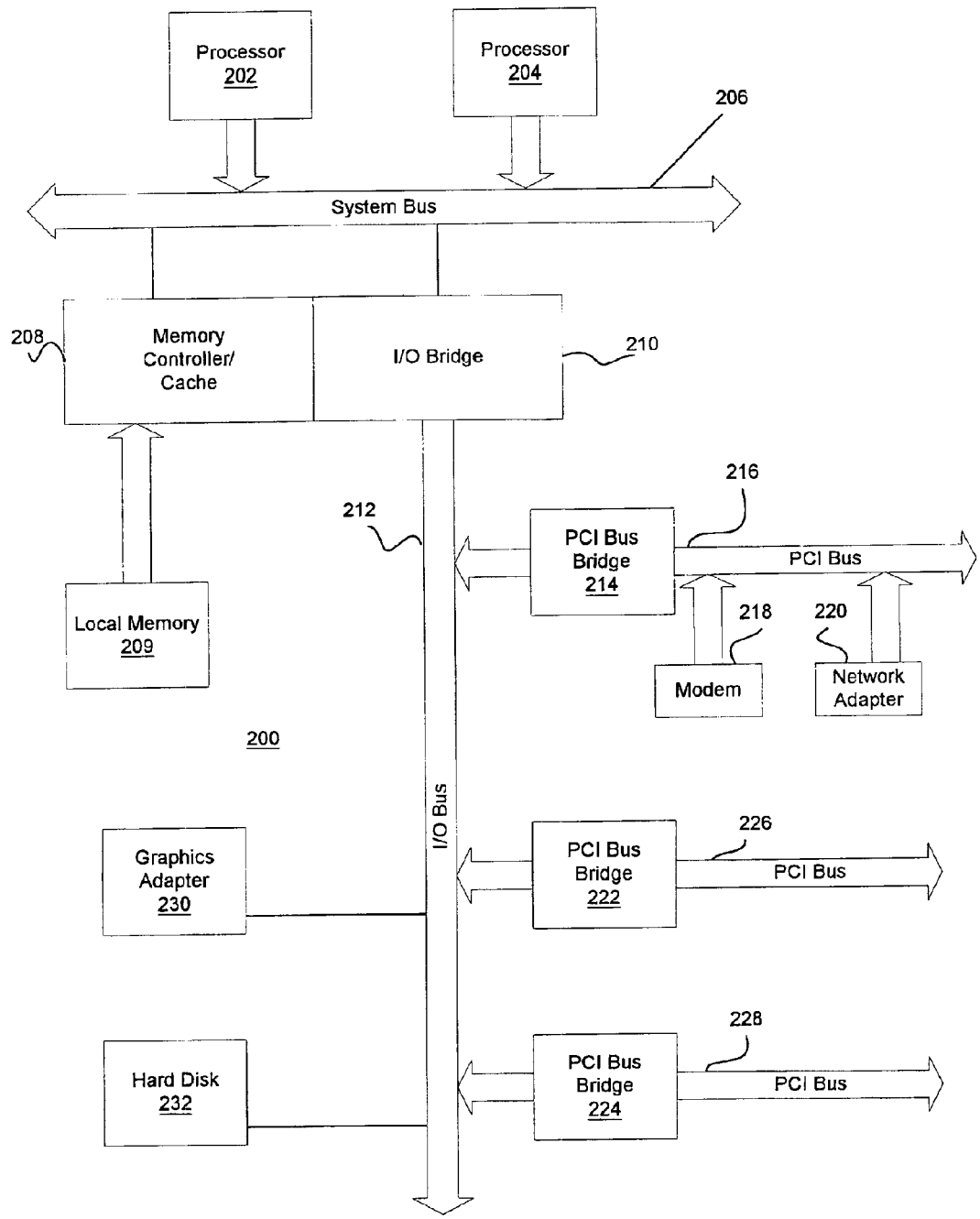
FIG. 2 is a block diagram a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. In the depicted examples, data processing system 200 is used as an electronic mail message server providing service to a number of different clients.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
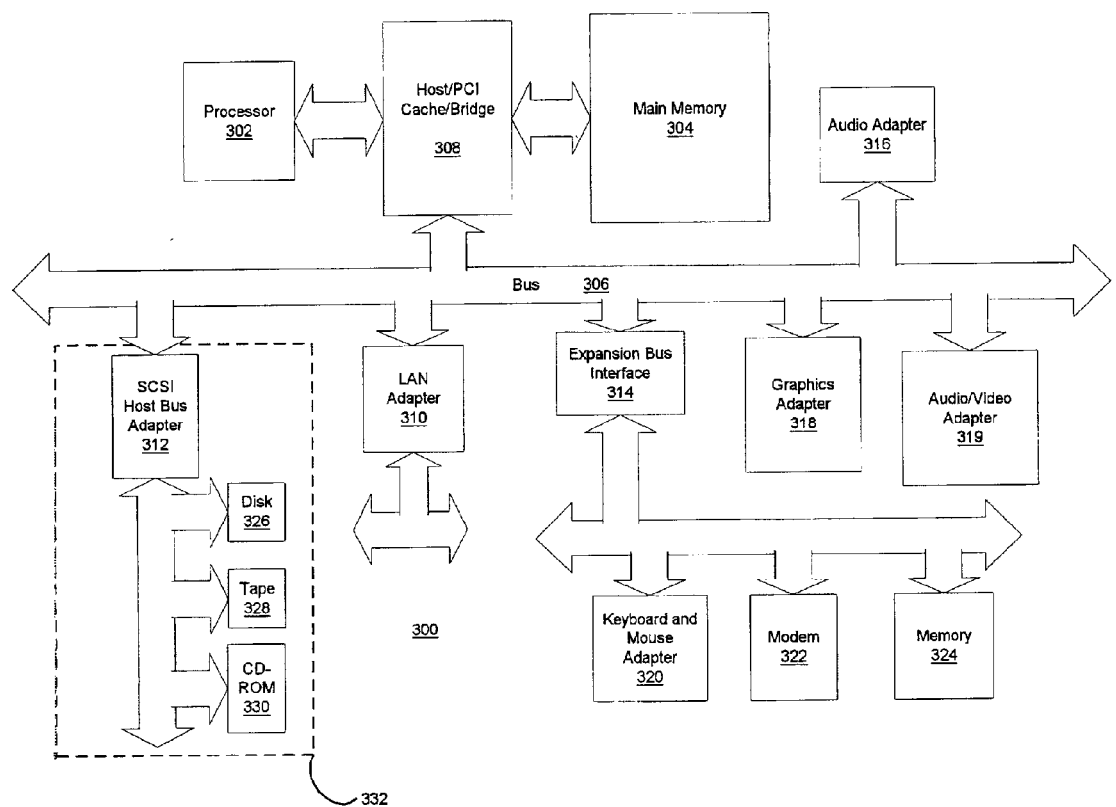
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. In these examples, data processing system 300 may include any mail program or application for generating, sending, and receiving messages.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. AJava@ is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for modifying rules for processing electronic messages. The mechanism of the present invention modifies a rule based on user input manipulating electronic messages. Through the mechanism of the present invention, a user may modify an existing rule for handling electronic messages by performing an action or manipulating an electronic message. For example, performing an action on a folder, such as dragging a message into the folder may modify an existing rule associated with processing electronic messages. In the example of dragging a new message into a folder, the attributes of the new message are checked against the rule associated with the folder. For example, these attributes may include address of the sender, subject, particular content, or any other information that may be contained in an electronic message. If the new message meets or matches the rules for the folder, the message is simply added to the folder. If a match with the rules is absent, the user is prompted to either change the rule or force the message into the folder leaving the rules unchanged.

Figure 4:
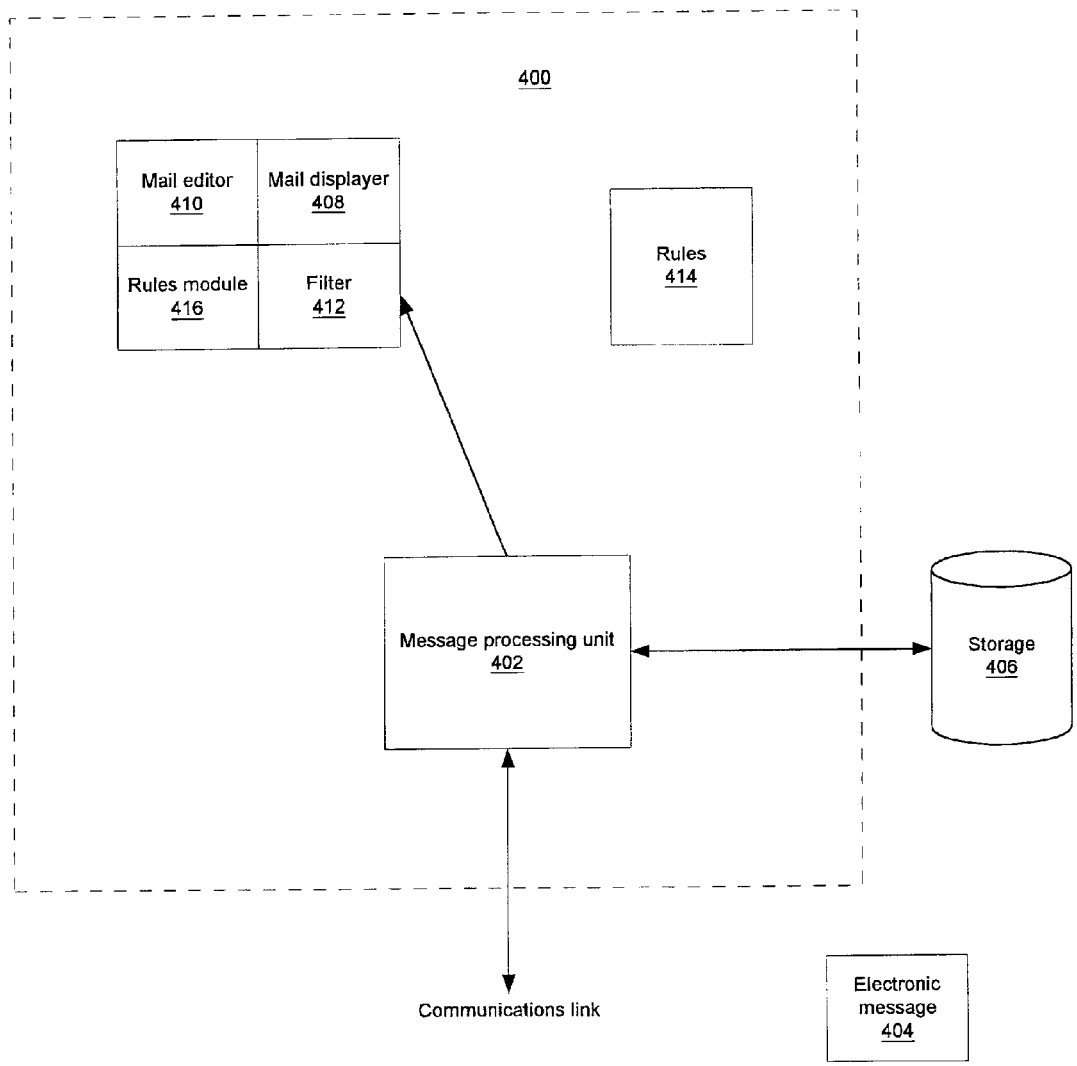
FIG. 4 is a block diagram of an e-mail program in accordance with a preferred embodiment of the present invention.

Turning next to FIG. 4, a block diagram of an e-mail program is depicted in accordance with a preferred embodiment of the present invention. E-mail program 400 in this example includes a message processing unit 402 which processes messages, such as electronic message 404, created and received by the user. Message processing unit 402 may be implemented by using currently available mail systems, such as Lotus Notes or CC Mail, which are available from Lotus Development Corporation. If electronic message 404 is an electronic message received by message processing unit 402, the electronic message may be stored in storage 406.

Mail program 400 also includes mail displayer 408, which is a graphical user interface (GUI) that is used to display electronic message 404. If the user edits or generates an electronic message, these functions may be accomplished through mail editor 410. Electronic messages may be placed into different folders in storage 406 by message processing unit 402 using filter 412. Filter 412 identifies actions to perform upon electronic messages based on the content in the messages and rules 414. Rules 414 include rules such as those for routing messages to various folders as well as taking other actions, such as forwarding or deleting electronic messages.

Further, mail program 400 includes a rules module 416, which is an example of where the processes of the present invention may be implemented. In particular, rules module 416 will identify user actions upon an electronic message and determine whether a rule is associated with the user actions. User actions that may be associated with rules include, for example, moving an electronic message into a folder, deleting an electronic message, or forwarding an electronic message. If a rule is associated with the user action, the electronic message is compared with the associated rule to see whether the electronic message matches a rule associated with a user action. If a match is present, no further action occurs. On the other hand, if a match with the rule is absent, a modification of the rule is then presented to the user for acceptance or modification. The user may accept or decline the modification to the rule.

The modification to the rule may be identified or generated using various criteria. The criteria may be based on content in selected portions of the electronic message or whether selected content is present in the electronic message. For example, the criteria may be to select the sender=s address for use in generating a rule with the subject matter of the message being the second option for use in generating the rule. The time and date in the electronic message is an example of another criteria. Any information in the electronic message may be used. For example, security (confidential vs non-confidential), importance (urgent, normal, fyi), carbon-copy address, size of the content or attachments, number of attachments, and Ato@ address may be used. Some criteria may be given priority over other criteria, using some priority rule depending on the implementation.

Turning next to FIGS. 5A–5D, diagrams illustrating a process for modifying a rule are depicted in accordance with a preferred embodiment of the present invention.

Figure 5A:
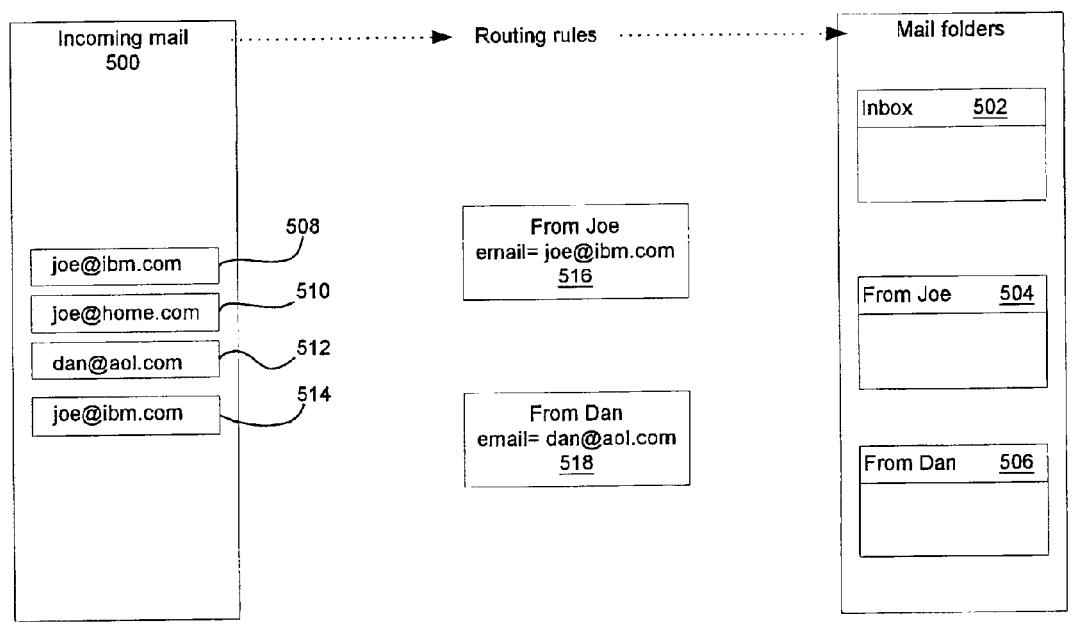
FIGS. 5A–5D are diagrams illustrating a process for modifying a rule in accordance with a preferred embodiment of the present invention.

In FIG. 5A, incoming mail 500 may be placed into mail folders entitled AInbox@ 502, AFrom Joe@ 504, and AFrom Dan@ 506 using various routing rules, such as rule 516. Typically, incoming mail 500 is placed into the folder AInbox@ 502 and may be rerouted or placed into another folder using rules associated with the other folders. In these examples, incoming mail 500 includes electronic messages 508–514. In this example, rules 516 and 518 are present for routing these messages. Rule 516 is called AFrom Joe@, while rule 518 is called AFrom Dan@. Rule 516 is associated with the folder AFrom Joe@ 504, and rule 518 is associated with the folder AFrom Dan 506. Electronic messages having an e-mail or sender address of Ajoe@ibm.com@ will be placed into the folder AFrom Joe@ 504 using rule 516. Electronic messages having a sender address of Adan@aol.com@ are placed into the folder AFrom Dan@ 506 using rule 518. The other electronic messages are placed into the folder AInbox@ 502 without being moved to another folder.

Figure 5B:
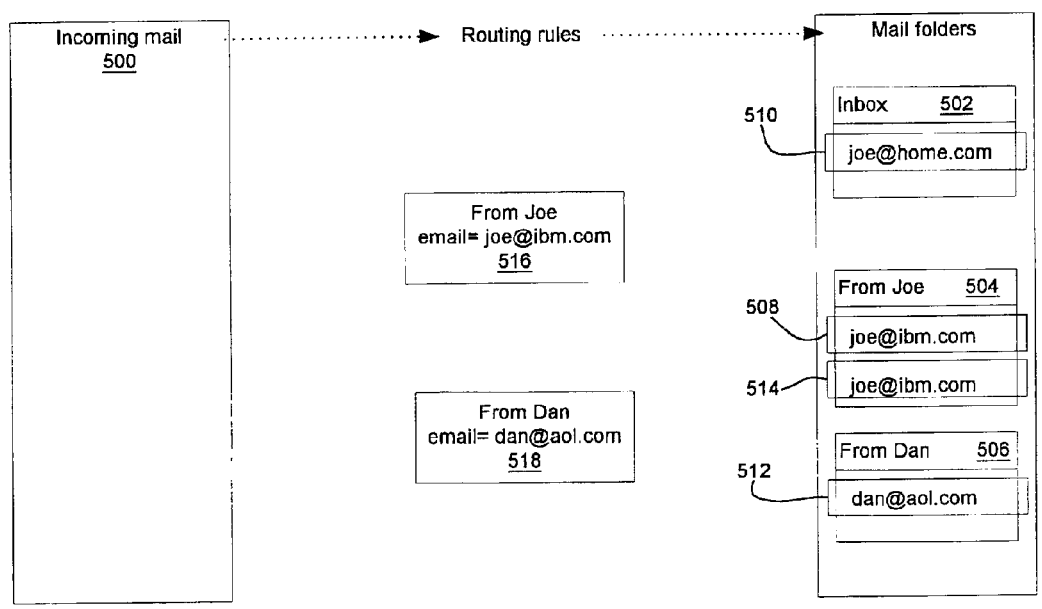

In FIG. 5B, electronic message 508 and electronic message 514 have been placed into the folder AFrom Joe@ 504. Electronic message 512 is moved into the folder AFrom Dan@ 506. Electronic message 510 remains in the folder AInbox@ 502 because no rule is present for handling this particular electronic message. In other words, electronic message 510 does not match rule 516 or rule 518.

Figure 5C:
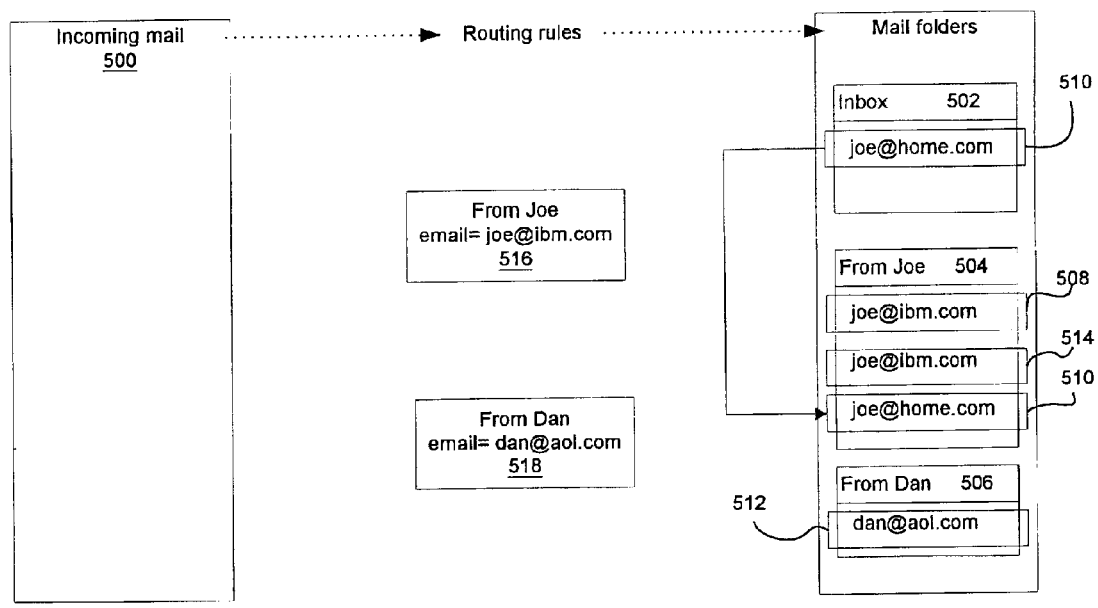

In FIG. 5C, the user moves electronic message 510 from the folder AInbox@ 502 to the folder AFrom Joe@ 504. The mechanism of the present invention detects this manipulation of electronic message 510 and compares electronic message 510 to rule 516 to determine whether a match is present. In this case, a match is absent because the sender address is Ajoe@home.com@ instead of Ajoe@ibm.com@. Electronic message 510 is examined and a proposed modification to rule 516 is identified using various criteria. This criteria may be priority based in which the first proposed modification is based on some characteristic or content in the electronic message.

Figure 5D:
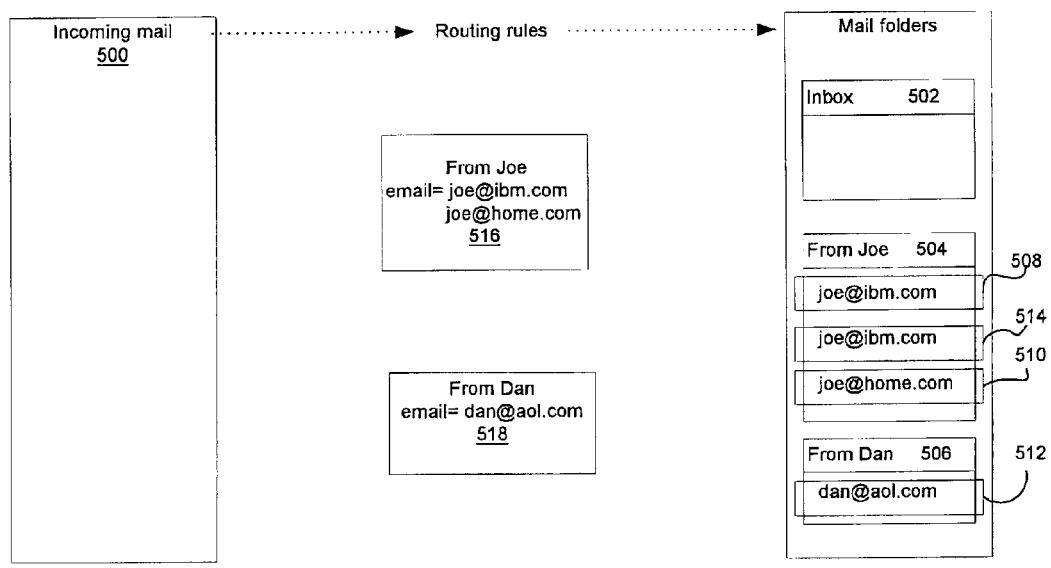

In FIG. 5D, a different address may be used to generate the proposed modification to rule 516 because rule 516 is based on a particular address for the sender of an electronic message. Of course, other characteristics of electronic message 510 may be used in generating a proposed rule other than basing it on the current rule. For example, a time stamp or a subject field for electronic message 510 may be used in generating the proposed modification to rule 516. The proposed rule is presented to the user who may accept the modification to the rule or reject it. If the modification is rejected, electronic message 510 may be placed in the folder even though it does not match rule 516. By accepting the modification of rule 516, now electronic messages containing the sender address of Ajoe@ibm.com@ and Ajoe@home.com@ will be placed into the folder AFrom Joe@ 504 as shown in FIG. 5D.

In this manner, the user is not required to navigate numerous dialog boxes to generate a rule. The rule is generated based on the existing mail and the user=s input. The user then is able to accept the rule, modify it, or cancel the action altogether.

Figure 6:
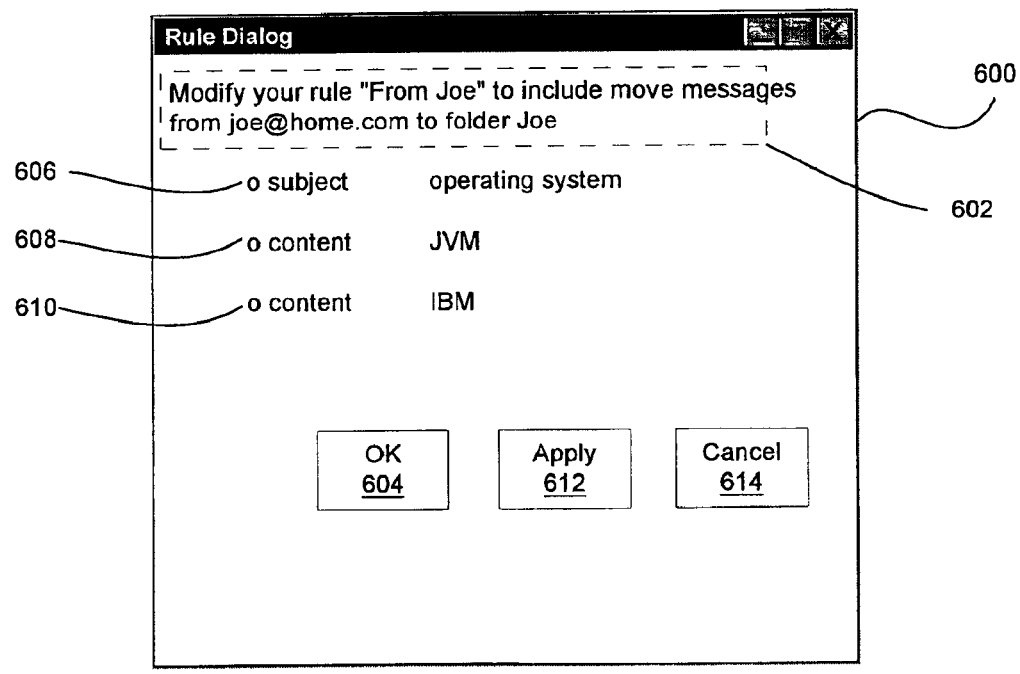
FIG. 6 is a diagram illustrating an example interface used to present a rule to a user in accordance with a preferred embodiment of the present invention.

Turning next to FIG. 6, a diagram illustrating an example interface used to present a rule to a user is depicted in accordance with a preferred embodiment of the present invention. Rule dialog 600 is an example of a dialog used to present a modification of a rule to a user based on the sequence of actions taken by a user in FIGS. 5A–5D. Dialog 600 presents a rule in section 602 to the user based on the user=s actions in moving electronic mail message 510 from the folder AInbox@ 502 to the folder AFrom Joe@ 504. In this example, the rule presented to the user is whether the user wants to modify the rule AFrom Joe@ to include messages originating from the address Ajoe@home.com@. The user may accept this proposed modification to the rule by selecting AOK@ button 604, which causes the rule to be saved.

Alternatively, the user may modify the rule by selecting alternatives such as the subject or content as presented by selections 606–610 in dialog 600. Of course, any characteristic of an electronic message may be used in selecting a proposed modification to an existing rule. The selection of the proposed modification depends on the particular implementation. After selecting one or more of these selections, a new rule may be generated by selecting AApply@ button (or similar device) 612. A new modification to the rule will then be presented to the user for viewing. If the user decides not to use the rule, the rule may be discarded by selecting ACancel@ button 614. If the user decides to cancel the modification, the electronic message may remain in the folder. The user may be presented with an option as to whether this electronic message should stay in the folder even though it does not match the rule. In such a situation, if the user decides that the electronic message should not stay in the folder, the mechanism of the present invention will return the electronic message to the folder from which it originated.

Turning next to FIG. 7, a flowchart of a process used for modifying a rule based on user manipulation of an electronic message is depicted in accordance with a preferred embodiment of the present invention. The process illustrated in FIG. 7 may be implemented in rules module 416 in FIG. 4. In this example, the process is initiated by the user selecting a menu or graphical control indicating that a new rule should be generated.

The process begins by receiving user input to manipulate the electronic message (step 700). In the depicted examples, the manipulation may take various forms, such as, for example, moving the electronic message from one folder to another folder, deleting the electronic message, or forwarding the electronic message. Next, an action on the electronic message is performed based on the user input (step 702). A determination is then made as to whether the electronic message has been moved to a rule-based folder (step 704). In other words, a determination is made as to whether the folder is associated with a rule for processing electronic messages.

If the electronic message has been moved to a rule-based folder, a determination is made as to whether the electronic message matches the rule (step 706). If the electronic message does not match the rule, the electronic message is parsed to identify characteristics or content within the electronic message (step 708). Then, a proposed modification to the rule for the folder is generated using the identified characteristics and/or content of the electronic message (step 710). The rule is presented to the user (step 712). Next, user input is received modifying and/or approving or disapproving the rule (step 714).

Next, a determination is made as to whether the rule was approved (step 716). If the rule was approved, the rule is stored for use in filtering or processing incoming electronic messages (step 718) with the process terminating thereafter. With reference again to step 716, if the rule was not approved, a determination is then made as to whether the electronic message should be moved even though the rule has not been approved (step 720). This step is an optional step, which may be implemented to provide a user an option to return the electronic message to the folder from which it was moved by the user or to allow the message to remain in the folder. If the electronic message should not have been moved, the electronic message is returned to the folder from which the electronic message originated (step 722) with the process terminating thereafter. Otherwise, the process terminates without taking any additional steps.

With reference again to step 704, if the electronic message has not been moved to a rule-based folder, the process terminates. With reference again to step 706, if the electronic message matches the rule associated with the folder, the process also terminates.

Thus, the present invention provides a method, apparatus, and computer implemented instructions for modifying mail rules based on user manipulation of electronic messages. The mechanism of the present invention allows modification of rules used to process electronic messages without requiring a user to specifically set out the rule. In response to the manipulation of the electronic message, a determination is made as to whether the manipulation is associated with a rule. These manipulations include, for example, deleting an electronic message, moving an electronic message from one folder to another folder, and forwarding an electronic message to another address.

A determination is made as to whether the manipulation is associated with a rule. If the manipulation is associated with a rule, a determination is made as to whether the electronic message matches the rule. If a match is absent, the electronic message is examined to identify characteristics for generating a proposed modification to the existing rule associated with the manipulation. If the user decides to accept this modification, future electronic messages are processed with the modified rule.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. In the depicted examples, the manipulation of the electronic message involved the movement of the electronic message from one folder to another folder. The mechanism of the present invention may be applied to all sorts of manipulations of electronic messages other than the illustrated one. Other manipulations of electronic messages include, for example, deleting an electronic message or forwarding an electronic message to another address. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically modifying rules to process electronic messages the method comprising the data processing system implemented steps of:
    detecting user input moving an electronic message into a folder, wherein a rule is associated with the folder;
    determining whether the electronic message matches the rule;
    identifying characteristics of the electronic message if a match between the rule and the electronic message is absent; and
    automatically modifying the rule using the characteristics to form a modified rule.

2. The method of claim 1 further comprising:
    processing received messages using the modified rule.

3. The method of claim 2, wherein the processing step is initiated in response to another user input approving use of the modified rule.

4. The method of claim 1, wherein the criteria includes priority-based common fields and common content.

5. The method of claim 1, wherein the folder is a trash folder.

6. The method of claim 1, wherein the characteristics includes at least one of a sender address, a selected word in a subject line body of the electronic message, a select word in a body of the electronic message, and an attribute of the time/date field of the electronic message.

7. The method of claim 1, wherein the identifying step includes:
    identifying the characteristics of the electronic message absent from the rule.

8. A method in a data processing system for automatically modifying rules for processing messages, the method comprising the data processing system implemented steps of:
    detecting a manipulation of an electronic message, wherein a rule is associated with the manipulation;
    determining whether the electronic message matches the rule;
    identifying characteristics of the electronic message if a match between the rule and the electronic message is absent; and
    automatically modifying the rule using the characteristics.

9. The method of claim 8, wherein the manipulation is a deletion of the message.

10. The method of claim 8, wherein the manipulation is a movement of the electronic message from a first folder to a second folder.

11. A data processing system comprising:
    a bus system;
    a communications unit connected to the bus system;
    a memory connected to the bus system, wherein the memory includes as set of instructions; and
    a processing unit connected to the bus system, wherein the processing unit executes the set of instructions to detect a manipulation of an electronic message in which a rule is associated with the manipulation, determine whether the electronic message matches the rule, identify characteristics of the electronic message if a match between the rule and the electronic message is absent, and automatically modify the rule using the characteristics.

12. The data processing system of claim 11, wherein the bus system is a single bus.

13. The data processing system of claim 11, wherein the bus system includes a primary bus and a secondary bus.

14. The data processing system of claim 11, wherein the processing unit includes a plurality of processors.

15. The data processing system of claim 11, wherein the communications unit is one of a modem and Ethernet adapter.

16. A data processing system for automatically modifying rules to process electronic messages, the data processing system comprising:
    detecting means for detecting user input moving an electronic message into a folder, wherein a rule is associated with the folder;
    determining means for determining whether the electronic message matches the rule;

identifying means for identifying characteristics of the electronic message if a match between the rule and the electronic message is absent; and modifying means for automatically modifying the rule using the characteristics to form a modified rule.

17. The data processing system of claim 16 further comprising:

processing means for processing received messages using the modified rule.

18. The data processing system of claim 17, wherein the processing means is initiated in response to another user input approving use of the modified rule.

19. The data processing system of claim 16, wherein the criteria includes priority-based common fields and common content.

20. The data processing system of claim 16, wherein the folder is a trash folder.

21. The data processing system of claim 16, wherein the characteristics includes at least one of a sender address, a selected word in a subject line body of the electronic message, a select word in a body of the electronic message, and an attribute of the time/date field of the electronic message.

22. The data processing system of claim 16, wherein the identifying means includes:

identifying means for identifying the characteristics of the electronic message absent from the rule.

23. A data processing system for automatically modifying rules for processing messages, the data processing system comprising:

detecting means for detecting a manipulation of an electronic message, wherein a rule is associated with the manipulation;

determining means for determining whether the electronic message matches the rule;

identifying means for identifying characteristics of the electronic message if a match between the rule and the electronic message is absent; and modifying means for automatically modifying the rule using the characteristics.

24. The data processing system of claim 23, wherein the manipulation is a deletion of the message.

25. The data processing system of claim 23, wherein the manipulation is a movement of the electronic message from a first folder to a second folder.

26. A computer program product in a computer readable medium for use in a data processing system for automatically modifying rules to process electronic messages:

first instructions for detecting user input moving an electronic message into a folder, wherein a rule is associated with the folder;

second instructions for determining whether the electronic message matches the rule;

third instructions for identifying characteristics of the electronic message if a match between the rule and the electronic message is absent; and fourth instructions for automatically modifying the rule using the characteristics to form a modified rule.

27. A computer program product in a computer readable medium for use in a data processing system for automatically modifying rules for processing messages, the computer program product comprising:

first instructions for detecting a manipulation of an electronic message, wherein a rule is associated with the manipulation;

second instructions for determining whether the electronic message matches the rule;

third instructions for identifying characteristics of the electronic message if a match between the rule and the electronic message is absent; and fourth instructions for automatically modifying the rule using the characteristics.

* * * * *